Aug. 28, 1956 — A. SWIETEK — 2,760,724
THERMOSTAT MOUNTING
Filed Sept. 13, 1955
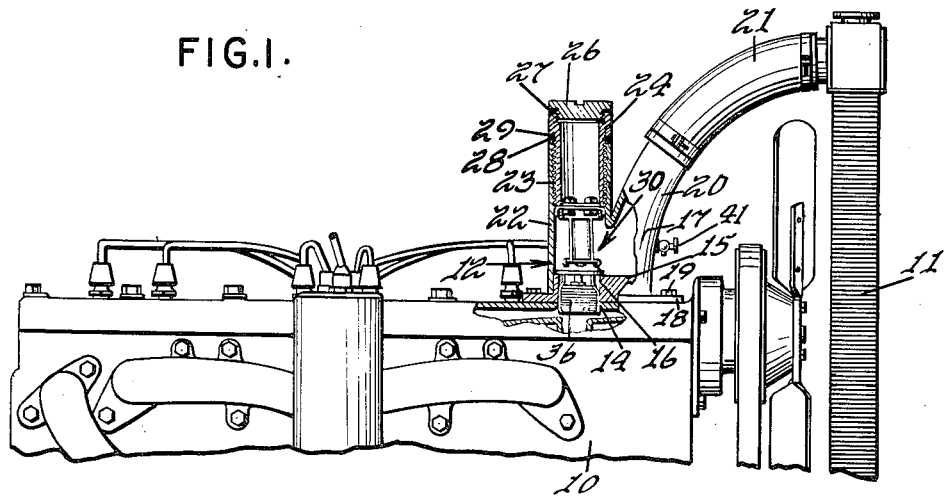
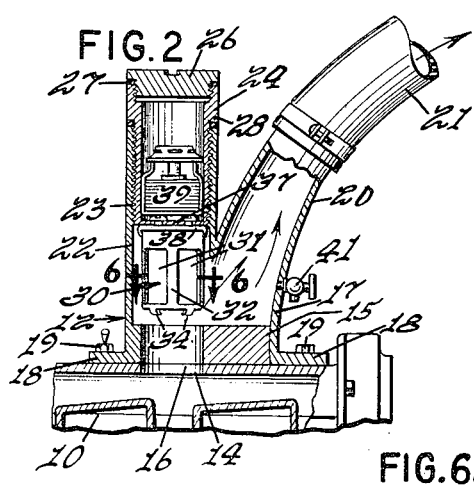
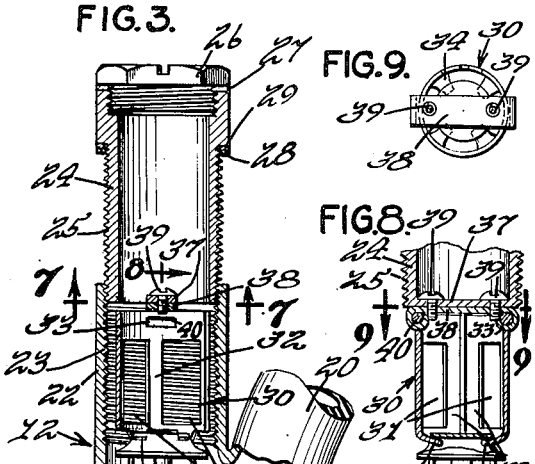
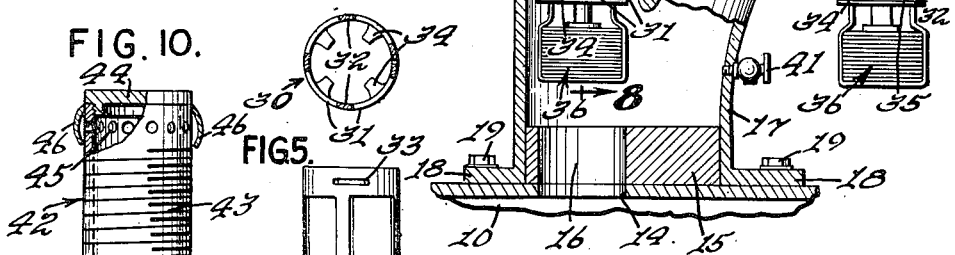
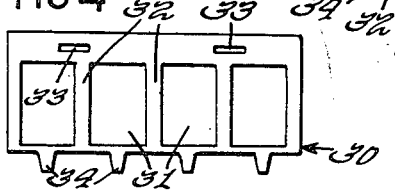
INVENTOR.
Anna Swietek
BY Victor J. Evans & Co.
ATTORNEYS

United States Patent Office 2,760,724
Patented Aug. 28, 1956

2,760,724

THERMOSTAT MOUNTING

Anna Swietek, Passaic, N. J.

Application September 13, 1955, Serial No. 533,951

2 Claims. (Cl. 236—34)

This invention relates to a thermostat, and more particularly to a thermostat mounting for a vehicle such as an automobile or truck.

The object of the invention is to provide a thermostat mounting for a vehicle cooling system whereby the position of the thermostat can be readily adjusted as desired.

Another object of the invention is to provide a thermostat mounting for a vehicle cooling system whereby the position of the thermostat can be readily shifted or adjusted for summer or winter use with a minimum of effort and without requiring any special tools.

A further object of the invention is to provide a thermostat mounting which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view illustrating a portion of a vehicle engine and showing the thermostat mounting and parts broken away and in section, the thermostat being shown in winter position.

Figure 2 is a fragmentary elevational view, with parts broken away and in section of the thermostat mounting, showing the thermostat stored for summer driving.

Figure 3 is an enlarged elevational view, with parts broken away and in section of the thermostat mounting, showing the thermostat in position for summer driving.

Figure 4 is a view illustrating the blank for making the support member.

Figure 5 is an elevational view showing the completed support member.

Figure 6 is a sectional view taken on the line 6—6 of Figure 2.

Figure 7 is a sectional view taken on the line 7—7 of Figure 3.

Figure 8 is a sectional view taken on the line 8—8 of Figure 3.

Figure 9 is a sectional view taken on the line 9—9 of Figure 8.

Figure 10 is an elevational view of a modified sleeve, with parts broken away and in section.

Referring in detail to the drawings, the numeral 10 designates an engine such as an internal combustion engine which may form part of a vehicle. However, the engine 10 may be used in any locality where desired. There is further provided a radiator 11 and the present invention is directed to a thermostat mounting which is indicated generally by the numeral 12. The top of the engine 10 may be provided with an opening 14 which registers with an opening 16 in an upstanding block 15. The mounting 12 includes a lower base portion 17 which has a flange 18 secured to the engine by means of suitable securing elements such as the bolts 19.

The housing 12 further includes a curved neck 20 which has a hose 21 connected thereto, and the hose 21 leads to the top of the radiator 11, Figure 1. Also extending upwardly from the housing and secured thereto or formed integral therewith is a collar 22 which is threaded interiorly as at 23. A cylindrical sleeve 24 has a threaded portion 25 arranged in threaded engagement with the portion 23 of the collar 22. A cap or plug 26 threadedly engages the top of the sleeve 24. A gasket 27 may be interposed between the cap 26 and the top of the sleeve 24, and a gasket 28 may be mounted below a shoulder 29 on the sleeve 24.

There is further provided a support member which is indicated generally by the numeral 30, and the support member 30 can be made into the shape shown in Figure 5 from the blank shown in Figure 4. The support member 30 includes a plurality of enlarged cutouts 31 which define strips 32 therebetween. The top of the support member 30 is provided with a pair of diametrically opposed slots 33, and extending inwardly from the lower end of the support member 30 are curved fingers 34. The fingers 34 are adapted to engage slots 35 in the top of a thermostat 36, Figure 8.

A means is provided for connecting the support member 30 to the bottom of the sleeve 24, and this means comprises a bar 37 which extends across the bottom of the sleeve. A brace 38 is connected to the bar 37 by means of bolts 39, and the brace 38 includes curved end portions 40 which engage the slots 33 in the top of the support member 30. A petcock 41 may be connected to the housing 12 for draining fluid therefrom.

Referring to Figure 10 of the drawings, there is shown a modified sleeve which is indicated generally by the numeral 42, and the sleeve 42 includes an exteriorly threaded portion 43. A cap 44 is detachably mounted on the top of the sleeve 42, and there is provided adjacent the upper end of the sleeve 42 a plurality of apertures or openings 45.

From the foregoing, it is apparent that there has been provided a thermostat mounting for an engine such as an internal combustion engine of a vehicle. With the present invention the thermostat 36 can be adjusted to different positions readily as for summer or winter driving. As shown in Figure 1 the thermostat 36 is in lowered position so that it projects down into the opening 16 whereby the flow of coolant through the system is readily controlled. As shown in Figure 2 the thermostat 36 has been detached from the bottom of the support member 30 and stored in the sleeve 24 as for summer driving. Or, as shown in Figure 3 the thermostat 36 can be raised up out of the opening 16 by unscrewing the sleeve 24 partly from the collar 22. Thus as the sleeve 24 is raised the support member 30 and thermostat 36 are also raised. When the thermostat 36 is to be detached so that it can be stored in the position shown in Figure 2, the members 34 can be readily disengaged from the slots 35 in the top of the thermostat. To move the parts from the position shown in Figure 3 to the position shown in Figure 1, it is only necessary to screw down the sleeve 24 so that the thermostat 36 moves from the position shown in Figure 3 down into the opening shown in Figure 1.

Thus, with the present invention the thermostat can be readily adjusted or moved around with a minimum of labor and with no extra cost. Furthermore, the thermostat can be adjusted without damaging the gaskets or without hurting the rubber hose which leads to the radiator. Furthermore, the assembly does not take up any space on the motor block. By unscrewing the sleeve 24 all the way from the housing 12, the thermostat 36 can be readily detached from the support member 30 as when it is to be stored in the position shown in Figure 2. The cap 26 is of course removed when the thermostat is to be arranged as shown in Figure 2, and then the cap is replaced. Thus, the thermostat can be adjusted without the necessity of taking the vehicle to a garage. The petcock 41 can be used to let fluid out when removing the thermostat. The cover 46 can be arranged around the openings 45 to prevent dirt or other foreign matter from entering the sleeve. The holes 45 serve to keep the water cooler in the motor block in the event the water gets too hot. When the sleeve 24 is raised up the thermostat moves up, and when the sleeve is moved down, the thermostat is moved down, so long as the thermostat is connected to the support member. The mounting of the present invention can be arranged in different positions, as for example it may be arranged on top of the motor block or on the side or in front of the motor block. Also, the parts can be made of any suitable material and may be welded together if desired.

The petcock 41 may be used to drain fluid out when connecting a new rubber radiator hose, or to take the thermostat out for removing scale or rust. Further, it is not necessary to take off the thermostat mounting from the motor block to flush the motor block, since it is merely necessary to unscrew the sleeve 24 with the thermostat and support member 30, and then put in the water hose to flush out the motor block. Also the support member 30 can be welded to the bottom of the sleeve 24 if desired. Thus, by welding the support member 30 and sleeve 24 together, the bars on the bottom of sleeve 24 and on top of member 30 can be eliminated.

I claim:

1. In combination a housing including a base, a curved neck extending upwardly from said base and providing an outlet conduit, a vertically disposed collar extending upwardly from said base and having an internally threaded portion, a vertically disposed sleeve having an exteriorly threaded portion threadedly engaging the threaded portion of said collar, a cap threadedly engaging the upper end of said sleeve, a bar secured to the lower end of said sleeve, a cylindrical support member mounted below said sleeve and including an annular side wall provided with a plurality of cutouts, there being diametrically opposed slots in the top of said support member, a brace connected to said bar and having downwardly curved end portions engaging said slots, inwardly curved fingers on the lower end of said support member, and a thermal valve detachably connected to said fingers.

2. The structure as defined in claim 1, wherein said sleeve is mounted for movement into and out of raised and lowered position in said collar to raise and lower said thermal valve when the thermostat is on the bottom of the support member.

References Cited in the file of this patent

UNITED STATES PATENTS

| | | |
|---|---|---|
| 2,086,360 | Hill | July 6, 1937 |
| 2,470,667 | Warrick et al. | May 17, 1949 |